United States Patent
Ohtomo et al.

(10) Patent No.: US 8,861,980 B2
(45) Date of Patent: Oct. 14, 2014

(54) LOOP FILTER

(75) Inventors: Yasuo Ohtomo, Kawasaki (JP); Nobukazu Koizumi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 498 days.

(21) Appl. No.: 13/233,588

(22) Filed: Sep. 15, 2011

(65) Prior Publication Data

US 2012/0134685 A1    May 31, 2012

(30) Foreign Application Priority Data

Nov. 30, 2010   (JP) .................. 2010-265994

(51) Int. Cl.
  *H04B 10/06* (2006.01)
  *H04B 10/61* (2013.01)

(52) U.S. Cl.
  CPC .......... *H04B 10/6164* (2013.01); *H04B 10/611* (2013.01); *H04B 10/614* (2013.01); *H04B 10/613* (2013.01); *H04B 10/616* (2013.01)
  USPC ........................... 398/207; 398/205; 398/206

(58) Field of Classification Search
  USPC ................................ 398/202–207
  See application file for complete search history.

(56) References Cited

U.S. PATENT DOCUMENTS

| | | | | |
|---|---|---|---|---|
| 5,499,268 A | * | 3/1996 | Takahashi | 375/231 |
| 2004/0101067 A1 | * | 5/2004 | Abe et al. | 375/322 |
| 2008/0113625 A1 | * | 5/2008 | Maeda et al. | 455/67.14 |
| 2009/0129787 A1 | | 5/2009 | Li et al. | |
| 2009/0245815 A1 | | 10/2009 | Zhang et al. | |
| 2010/0014605 A1 | * | 1/2010 | Geile et al. | 375/260 |

FOREIGN PATENT DOCUMENTS

| | | |
|---|---|---|
| JP | 2009-130935 A | 6/2009 |
| JP | 2009-253971 A | 10/2009 |

* cited by examiner

*Primary Examiner* — Dzung Tran
(74) *Attorney, Agent, or Firm* — Fujitsu Patent Center

(57) ABSTRACT

A loop filter include: a register that stores a result of arithmetic operation performed on a complex signal and outputs the stored complex signal; a first multiplier that multiplies the complex signal output from the register and a predetermined coefficient; an absolute value judging unit that outputs a multiplier coefficient used to control such that the amplitude of the complex signal output from the register is held in a predetermined range; a multiplier that multiplies an output from the first multiplier and the multiplier coefficient; a second multiplier that multiplies an input signal and a value (1–the predetermined coefficient); and an adder that adds an output from the multiplier to an output from the second multiplier and inputs a result of addition into the register.

10 Claims, 8 Drawing Sheets

CONVERGENCE CHARACTERISTIC
(RELATED ART)

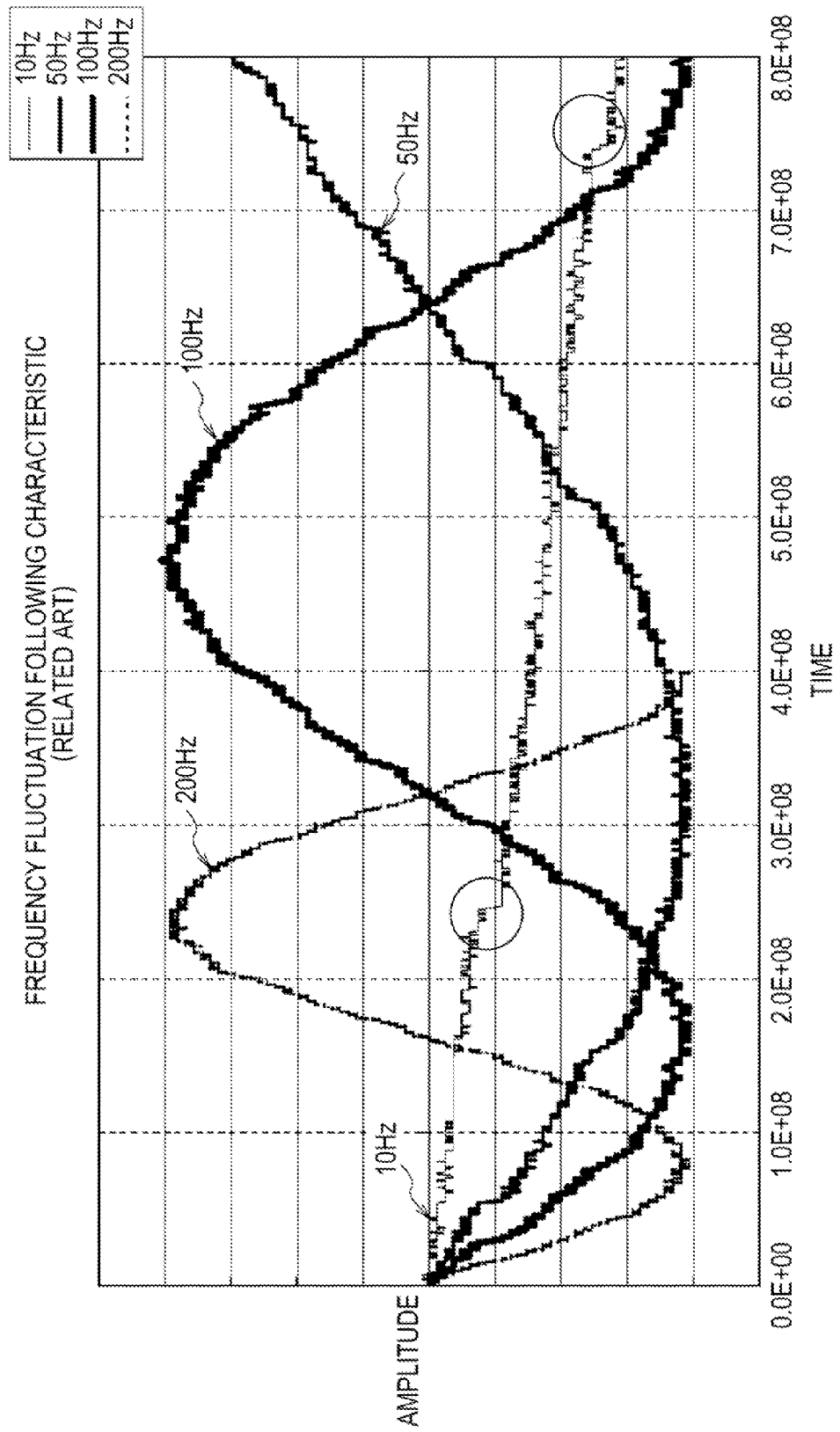

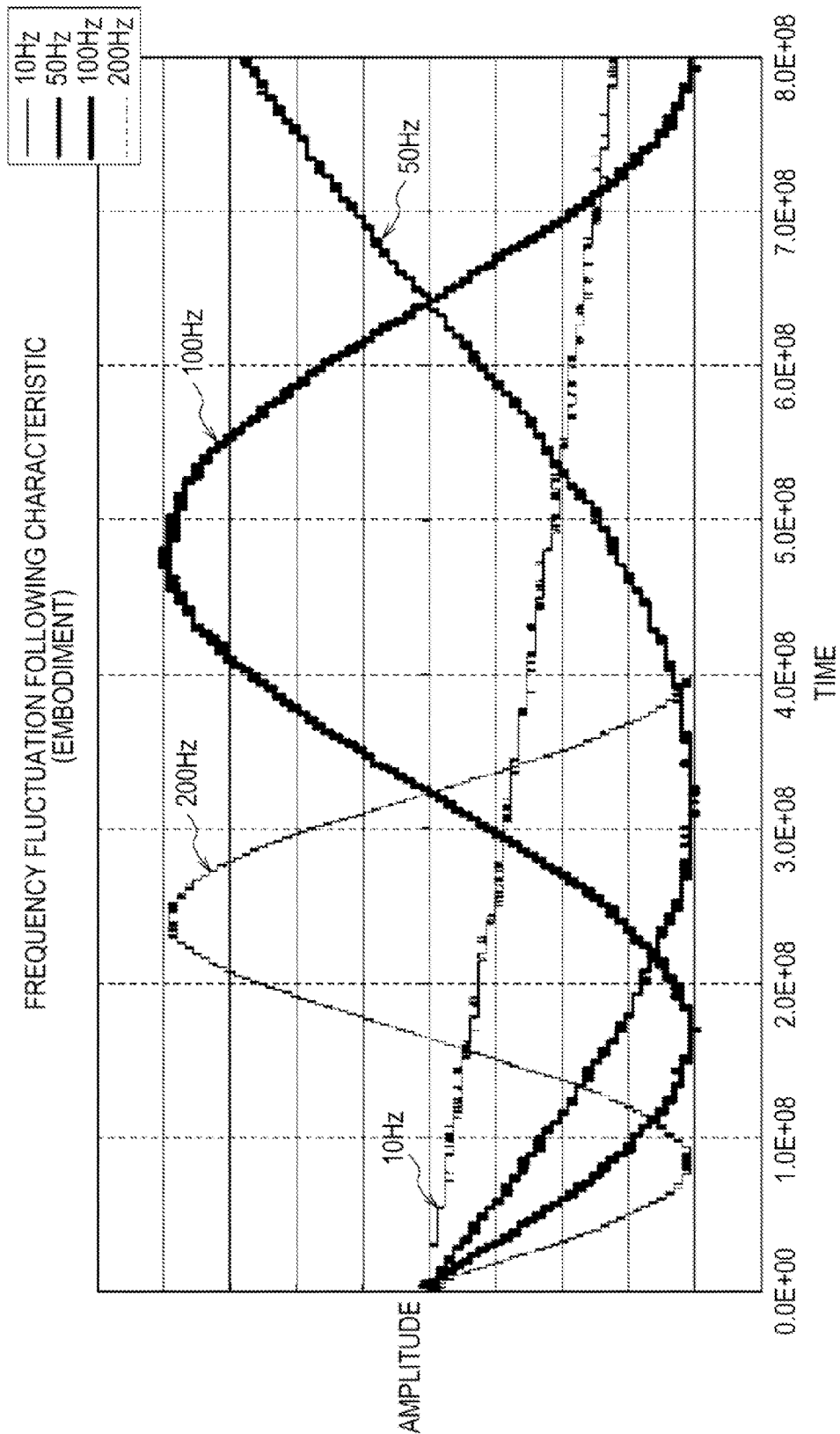

LOOP FILTER

CROSS REFERENCE TO RELATED APPLICATION

This application is based upon and claims the benefit of priority from the prior Japanese Patent Application NO. 2010-265994 filed on Nov. 30, 2010, the entire contents of which are incorporated herein by reference.

FIELD

An embodiment disclosed hereinafter are related to a loop filter.

BACKGROUND

A steep increase in communication traffic with spreading use of new services such as moving image distribution and the like utilizing cloud computing and Internet is expected. Studies and development of an optical transmitter-receiver that may transmit a signal which is as fast as 100 Gbps are now being carried forward in order to cope with the communication traffic which is being increased.

However, if the bit rate per one wavelength is increased, the signal quality will be degraded owing to a reduction in proof stress to optical signal to noise ratio (OSNR) and waveform distortion caused by wavelength dispersion, polarization mode dispersion or nonlinear effect of a transmission path. Therefore, attention is now being paid to an optical digital coherent receiving system that has proof stresses to the OSNR and wavelength distortion of the transmission path.

Since the optical digital coherent receiving system allows improvement of proof stress to the OSNR, compensation for waveform distortion using a digital signal processing circuit and adaptive equalization to a temporal variation of the propagation characteristic of an optical transmission path, characteristics of high quality may be obtained even in transmission performed at a high bit rate.

In addition, the optical digital coherent receiving system is a system that extracts light intensity and phase information by a coherent receiving system and quantizes the extracted light intensity and phase information using an ADC (Analog-Digital Converter) to demodulate them using a digital signal processing circuit unlike an existing system of allocating ON-state light intensity and OFF-state light intensity to a binary signal to perform direct detection.

DP-QPSK (Dual Polarization-Quadrature Phase Shift Keying) which is one of phase modulation systems used in the optical digital coherent receiving system allows to allocate two-bit data to four modulated optical phases (0 degrees, 90 degrees, 180 degrees and 270 degrees) for each of P-polarized light and S-polarized light. Since in the DP-QPSK, the symbol rate may be reduced to one-fourth the information transfer rate, downsizing and cost saving of the system may become possible.

FIG. 1 is a block diagram illustrating an example of a configuration of an optical digital coherent receiver.

A light signal that has been input through an optical fiber 10 is split into a P-polarized light signal and an S-polarized light signal which are orthogonal to each other using a polarization beam splitter (PBS) 11. The polarized light signals so split using the polarization beam splitter 11 are respectively input into 90° optical hybrids 13 and 14. The optical digital coherent receiver also includes a locally oscillating light source 15 that locally oscillates light of a predetermined frequency. The light oscillated from the locally oscillating light source 15 is split into the P-polarized light and the S-polarized light using the polarization beam splitter 12. The polarized lights so split using the polarization beam splitter 12 are respectively input into the 90° optical hybrids 13 and 14. Here, the light signals respectively input into the 90° optical hybrids 13 and 14 mach the light oscillated from the locally oscillating light source in polarization. That is, when the light signal which is input into the 90° optical hybrid 13 from the polarization beam splitter 11 is the P-polarized light, the light output from the polarization beam splitter 12 is also the P-polarized light. Likewise, since the light signal which is input into the 90° optical hybrid 14 from the polarization beam splitter 11 is the S-polarized light in the above mentioned case, the light from the polarization beam splitter 12 is also the S-polarized light.

The light signal which has been sent through the optical fiber 10 and then split and polarized is mixed with the light which has been oscillated from the local light emitting source 15 and then split and polarized in the 90° optical hybrids 13 and 14. A phase modulation component in the light signal is converted to a change in intensity of the light signal by mixing the light signal with the light oscillated from the locally oscillating light source. A photoelectric converter 16 converts the light signals from the 90° optical hybrids 13 and 14 to electric signals. The received signals so converted to the electric signals using the photoelectric converter 16 are converted to digital signals using an ADC unit 17. The digital signals so converted using the ADC unit 17 are digitally subjected to signal processing using a digital signal processing circuit 25.

In the digital signal processing circuit 25, first, a process of removing signal distortion from the signal sent from the ADC unit 17 is digitally performed using a waveform distortion compensator 18. The waveform distortion compensator 18 removes a fixed component of distortion based on the characteristics of the optical fiber 10 in the signal distortion that the light signal has been suffered owing to wavelength dispersion, polarization mode dispersion, nonlinear effect and the like while it is being propagated through the optical fiber 10.

An output from the waveform distortion compensator 18 is input into a phase adjustor 19. In the phase adjustor 19, the timing of sampling the received signal is adjusted. If the sampling timing of the received signal matches the symbol transition timing, it will become difficult to correctly detect the signal value. Therefore, the sampling timing is adjusted to avoid such a situation as mentioned above. The phase adjustor 19 receives a result of timing detection from a timing regenerator 20 that detects the sampling timing and generates a timing adjustment signal. The timing adjustment signal is sent to a frequency variable oscillator 21 that generates a clock signal to be sent to the ADC unit 17. The frequency variable oscillator 21 adjusts the frequency and the phase of the clock signal on the basis of the timing adjustment signal and inputs the clock signal into the ADC unit 17. The ADC unit 17 samples the received signal on the basis of the clock signal so adjusted in frequency and phase.

An output from the phase adjustor 19 is input into an adaptive equalizer 22. The adaptive equalizer 22 performs a process of removing the signal distortion caused by aged deterioration or the like of the optical fiber 10 on the signal. The signal distortion removing process that the waveform distortion compensator 18 has performed is a fixed compensating process which is not sufficient to completely remove signal distortion components. Therefore, the adaptive equalizer 22 compensates for the signal distortion components which are left uncompensated.

An output from the adaptive equalizer 22 is input into a light source frequency offset estimation and compensation unit 23. The light source frequency offset estimation and compensation unit 23 performs a process of stopping rotation of a signal point on an I-Q plane caused by an offset of the frequency of the light from the locally oscillating light source 15 from the frequency of the received signal sent through the optical fiber 10. This process is performed in order to eliminate a fixed phase deviation of a complex signal included in the output signal from the adaptive equalizer 22.

An output from the light source frequency offset estimation and compensation unit 23 is input into a carrier phase offset estimation and compensation unit 24. The light source frequency offset estimation and compensation unit 23 has performed the process of removing a difference between the frequency of the received signal and the frequency of the locally oscillated light. Although rotation of the signal point on the I-Q plane is stopped by performing the above process, the signal point may possibly stay at a 90-deg-rotated position simply by performing the above mentioned process. Therefore, the carrier phase offset estimation and compensation unit 24 performs a process of removing a phase offset occurred owing to 90-deg-rotation of the signal point on the I-Q plane on the input signal.

The light source frequency offset estimation and compensation unit 23 is a circuit that detects a light source frequency offset which will be desired to remove a light frequency deviation (offset) occurred between a signal light source of a transmitter and a locally oscillated light source of a receiver and includes a loop filter and the like.

In an adaptive equalization type filter which is the kind of the loop filter, if much noise is included in an input signal into that filter, it will sometimes occur that a convergent value of a filter coefficient to be updated approaches zero (0) and hence it becomes difficult to obtain a signal which is accurate enough to be used as an output from the filter as in the case of the loop filter included in the light source frequency offset estimation and compensation unit 23.

FIG. 2 is a diagram illustrating an example of a light source frequency offset estimation circuit according to related part.

In the example in FIG. 2, all processes to be performed using preceding units of an arg ( ) unit 38 are performed by complex number (I, Q) arithmetic operations and the arg ( ) unit 38 arithmetically operates the phase (the argument) of a complex signal output from its last preceding unit.

The loop filter used for estimation of a frequency offset amount is an oblivion average type IIR filter having a coefficient $(1-\alpha) \ll 1.0$.

The light source frequency offset estimation and compensation unit 23 includes a light source frequency offset estimation circuit 29 illustrated in FIG. 2 and a unit that removes the frequency offset using a frequency offset value which is output from the light source frequency offset estimation circuit 29. The complex signal which is output from the adaptive equalizer 22 is input into the light source frequency offset estimation circuit 29. The complex signal is a signal that includes an I signal as a real number component and a Q signal as an imaginary number component and when the term "complex signal" is used, it means a set of an I signal and a Q signal in reality. The input complex signal is input into an intersymbol phase difference detection unit 32. The input complex signal is also input into a one-symbol delayer 31 and then input onto the intersymbol phase difference detection unit 32 after delayed by one symbol using the delayer. The intersymbol phase difference detection unit 32 arithmetically operates a difference between the two input complex signals. The difference signal is obtained by performing complex subtraction and is in the form of a complex signal that includes the phase difference between two symbols in its phase component. A signal obtained by subtracting an output from a loop filter 30 from this intersymbol phase difference signal is output from the intersymbol phase difference detection unit 32.

The output from the intersymbol phase difference detection unit 32 is input into the loop filter 30. In the loop filter 30, the complex signal is multiplied by $(1-\alpha)$ using a multiplier 34 and is input into an adder 35. Here, $\alpha$ is a previously determined value and a real number value that satisfies a relation $1 > \alpha > 0$. The adder 35 performs complex addition and adds a value obtained by multiplying an output from a phase rotation amount vector storage unit 36 by $\alpha$ (the same as the above mentioned coefficient) using a multiplier 37 to an output from the multiplier 34.

The phase rotation amount vector storage unit 36 is configured using a register and stores an output from the adder 35. The adder 35 calculates a formula (an output from the intersymbol phase difference detection unit)$\times(1-\alpha)$+(data in the phase rotation amount vector storage unit)$\times\alpha$ to arithmetically operate an average of signals input into the loop filter 30. That is, although in general, a weighted average of x and y is obtained from $(a \times x + b \times y)/(a+b)$ wherein a and b are weights, when $a+b=1$, $a=1-b$ and hence the above formula for the average is obtained. Thus, the average value obtained using the adder 35 is a weighted average value. Thus, the output from the intersymbol phase difference detection unit and $(1-\alpha)$ are multiplied using the multiplier 34, the data in the phase rotation amount vector storage unit and $\alpha$ are multiplied using the multiplier 37, and the obtained multiplied values are added together to obtain the average value which is weighted by the above a and b. The output from the phase rotation amount vector storage unit 36 is an average of the signals input into the loop filter 30 and an angle component (a phase component) of the average signal (the phase rotation amount vector) on an I-Q plane is arithmetically operated using the arg ( ) unit 38 and is output as a frequency offset value. The frequency offset value is used to remove the frequency offset included in the received signal.

An output from the loop filter 30 is fed-back to the intersymbol phase difference detection unit 32 and is used to be subtracted from an intersymbol phase difference obtained using the intersymbol phase difference detection unit 32. In the example, since the frequency offset is removed using a succeeding unit of the arg ( ) unit 38 using the output from the loop filter 30, subtraction of the phase difference corresponding to the above operation is performed by subtracting the output from the loop filter 30 from the intersymbol phase difference.

Various frequency offset detection and estimation circuits are known in the related art.

PATENT DOCUMENT

Japanese Laid-open Patent Publication No. 2009-253971 and Japanese Laid-open Patent Publication No. 2009-130935 are examples of related art.

Incidentally, if noise included an input into a loop filter is increased in a light source frequency offset estimation circuit as mentioned above, an intersymbol phase difference will have random values. Thus, the magnitude (an absolute value) of the phase rotation amount vector which is an average of the above random values will have a value near zero (0) and its amplitude itself will be reduced. When once it enters an amplitude reduced state, it may be difficult to recover from this state and the amplitude may not return to its normal state readily. Then, the accuracy in arg ( ) conversion may be lost and flapping may occur in output characteristic by reducing the amplitude of the phase rotation amount vector. That is, although arg ( ) conversion is performed by digital arithmetic processing, since the phase rotation amount vector is indicated by a digital signal of a predetermined number of bits, the number of bits used to express the phase rotation amount vector may be reduced with reducing the amplitude. If arg ( ) conversion is performed using the bit-number-reduced phase rotation amount vector, the accuracy of a result of arithmetic operation of the angle component (the argument) will be reduced owing to a reduction in accuracy of the value of the phase rotation amount vector and a phenomenon such as flapping or the like will occur in the result of arithmetic operation of the angle component. Therefore, such a situation that the frequency offset is not sufficiently removed may occur and finally such a problem may be generated that bit error rate characteristics obtained when the received signal has been decoded is degraded.

SUMMARY

According to an embodiment disclosed hereinafter, there is provided a loop filter including: a register that stores a result of arithmetic operation performed on a complex signal and outputs the stored complex signal, a first multiplier that multiplies the complex signal output from the register and a predetermined coefficient, an absolute value judging unit that outputs a multiplier coefficient used to control such that the amplitude of the complex signal output from the register is held in a predetermined range, a multiplier that multiplies an output from the first multiplier and the multiplier coefficient, a second multiplier that multiplies an input signal and a value (1−the predetermined coefficient), and an adder that adds an output from the multiplier to an output from the second multiplier and inputs a result of addition into the register.

The object and advantages of the embodiments will be realized and attained by means of the elements and combinations particularly pointed out in the claims.

It is to be understood that both the foregoing general description and the following detailed description are exemplary and explanatory and are not restrictive of the embodiments, as claimed.

BRIEF DESCRIPTION OF DRAWINGS

FIG. 7 is a diagram illustrating an example of a result of simulation made on related art; and FIG. 8 is a diagram illustrating an example of a result of simulation made on the embodiment.

DESCRIPTION OF EMBODIMENTS

Figure 3:
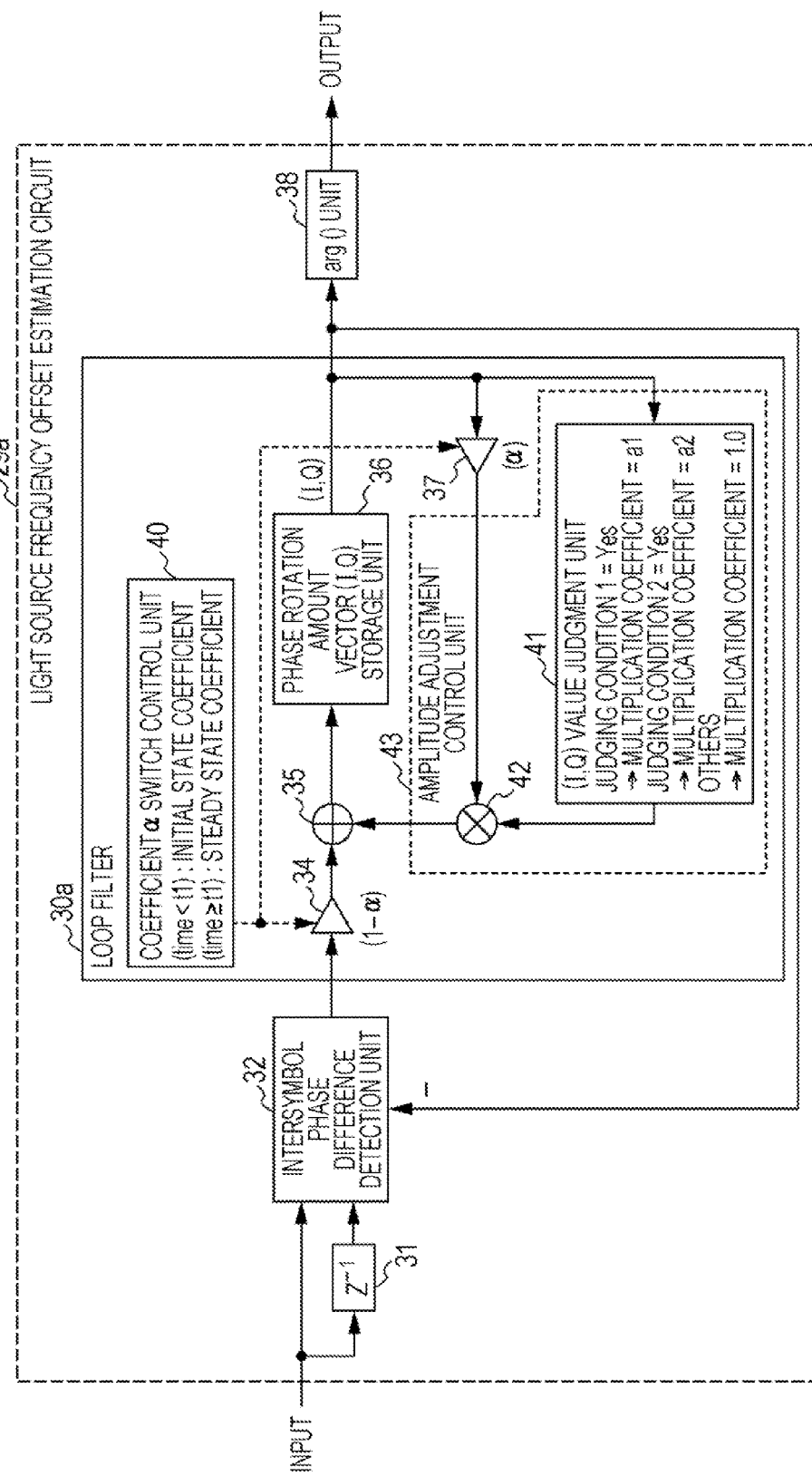
FIG. 3 is a block diagram illustrating an example of a configuration according to an embodiment.

FIG. 3 is a block diagram illustrating an example of a configuration according to an embodiment.

Figure 1:
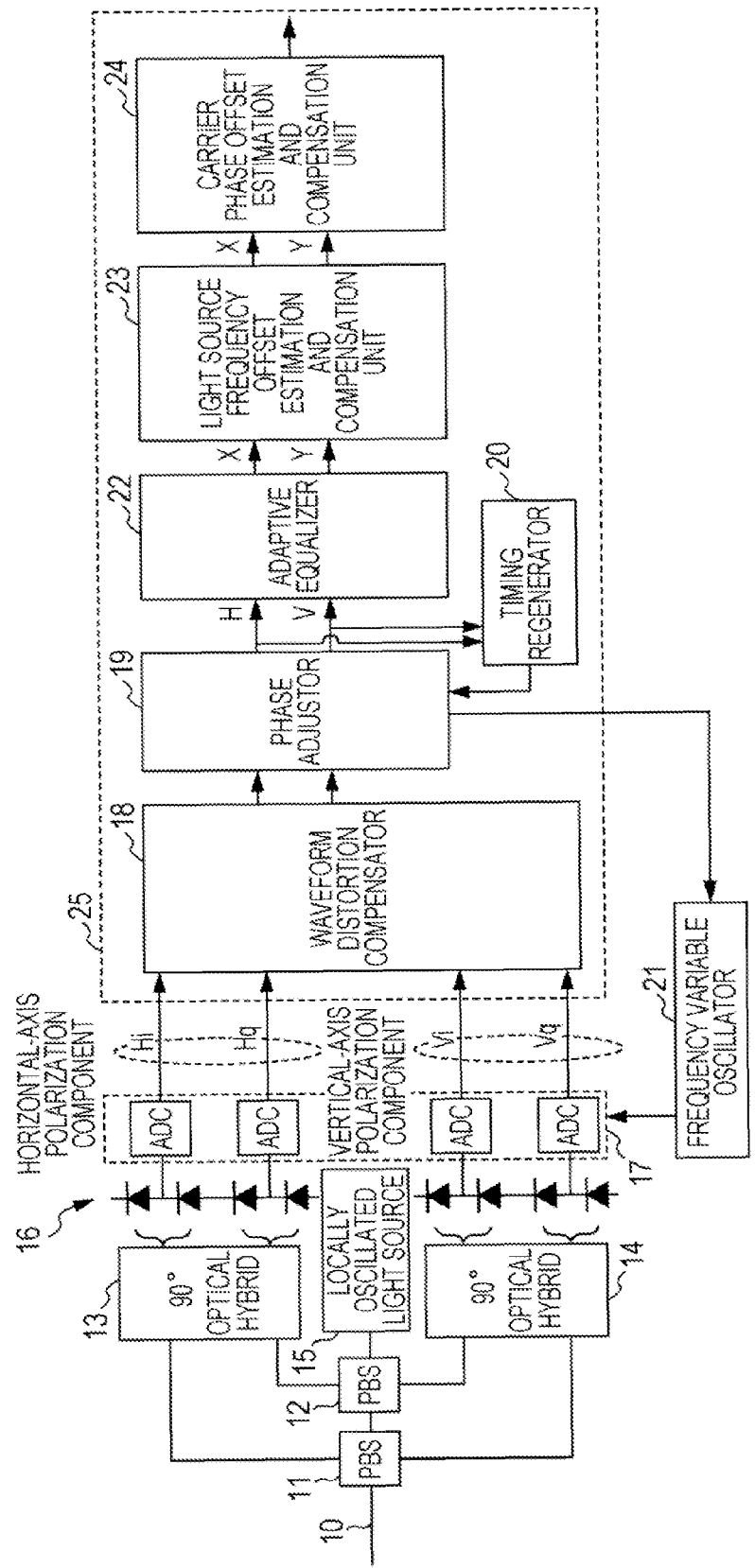
FIG. 1 is a block diagram illustrating an example of a configuration of an optical digital coherent receiver.
Figure 2:
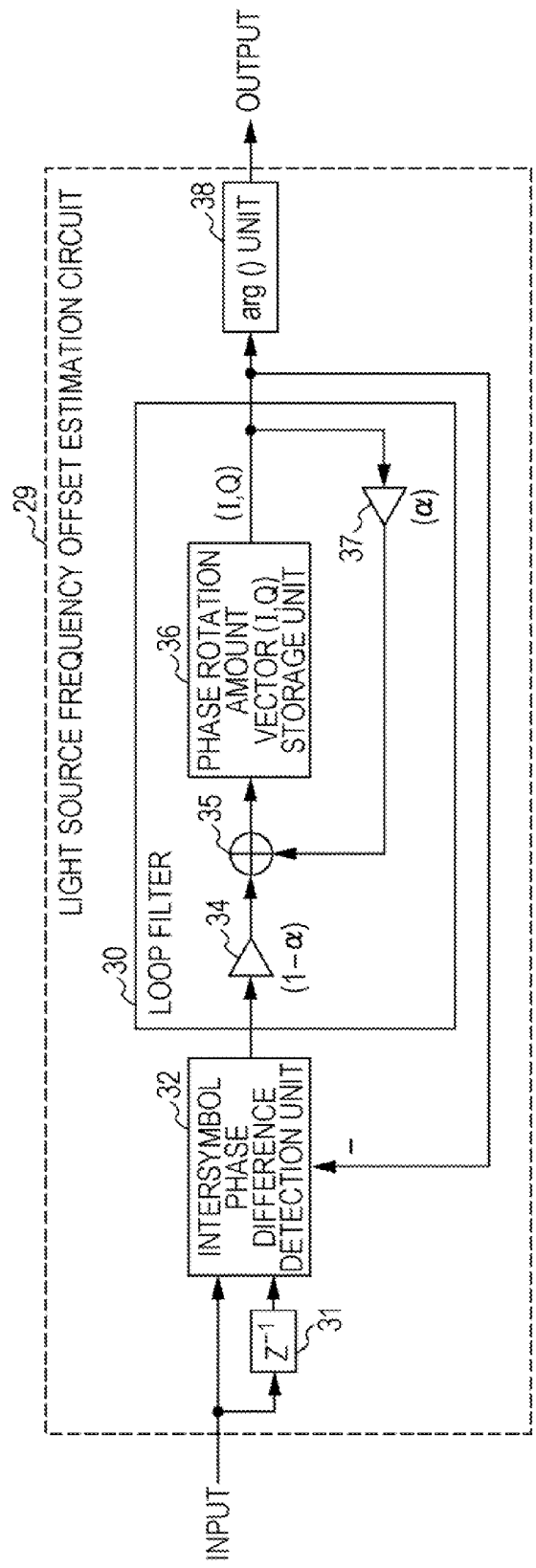
FIG. 2 is a diagram illustrating an example of a light source frequency offset estimation circuit of related art.

In FIG. 3, the same numerals are assigned to the same constitutional elements as those in FIG. 2 and description thereof will be omitted.

In the example illustrated in FIG. 3, a loop filter 30a according to an embodiment includes am amplitude adjustment control unit 43 that adjusts the amplitude of a phase rotation amount vector within the loop filter 30a to a value which is lower than an upper limit value and higher than a lower limit value, that is, a value within a predetermined range. In addition, a multiplier 42 adapted for amplitude adjustment is implemented by a bit shift circuit and an adder so as to reduce the circuit scale. Further, a coefficient α switch control unit 40 that switches a loop filter coefficient value α from an initial state value to a steady state value or vice versa is included.

The amplitude adjustment control unit 43 includes an (I, Q) value judging unit 41 that compares an absolute value of each of an I signal and a Q signal with a threshold value and makes a judgment, and the multiplier 42 that multiplies a multiplier coefficient and an output from the multiplier 37. The amplitude adjustment control unit 43 controls to receive an output (a phase rotation amount vector) from the phase rotation amount vector storage unit 36 and compare the amplitude thereof with a threshold value to make a judgment. The amplitude adjustment control unit 43 controls the multiplier 42 to multiply a feedback signal that the phase rotation amount vector and the coefficient α are multiplied and a coefficient determined in accordance with a result of judgment using the multiplier 42 and to input a result into the adder 35. The multiplier 42 which is adapted to multiply the coefficient and the feedback signal is implemented by the bit shift circuit and the adder as described above. The (I, Q) value judging unit 41 judges whether an input satisfies a judging condition 1 or a judging condition or the input applies to other cases and outputs each multiplier coefficient obtained from each case. A judgment logic of the (I, Q) value judging unit 41 is implemented by a logical circuit. The judging condition 1 is for judgment whether the absolute value of the I signal is at least an upper limit value or the absolute value of the Q signal is at least the upper limit value. When the judging condition 1 is established, the (I, Q) value judging unit 41 outputs a multiplier coefficient a1. The judging condition 2 is for judgment whether the absolute value of the I signal is not more than a lower limit value and the absolute value of the Q signal is not more than the lower limit value. When the judging condition 2 is established, the (I, Q) value judging unit 41 outputs a multiplier coefficient a2. In other cases, 1.0 is output as the multiplier coefficient.

The upper and lower limit values are to be set in advance by a designer and are determined by making experiments and simulations. In addition, the multiplier coefficients a1 and a2 are to be determined in advance by making experiments and simulations on condition that a relation a1<1.0<a2 be satisfied. That is, when the judging condition 1 is established, the absolute value(s) of one of or both of the I signal and the Q signal of the phase rotation amount vector is/are too large and hence the feedback signal is multiplied by the multiplier coefficient also as to reduce the magnitude of the phase rotation amount vector. When the judging condition 2 is established, the absolute values of the I signal and the Q signal of the phase rotation amount vector are too small and the feedback signal is multiplied by the multiplier coefficient a2 so as to increase the magnitude of the phase rotation amount vector. In other cases, since the absolute values of the I and Q signals of the phase rotation amount vector are respectively held within a predetermined range defined by upper and lower limit values, the phase rotation amount needs only be passed through the multiplier 42 without changing its magnitude. Thus, the feedback signal is multiplied by 1.0 as the multiplier coefficient.

A coefficient α switch control unit 40 counts a time from start of execution of a receiving process, holds a constant time t1 as a predetermined constant and changes the value of the coefficient α to be set in the multipliers 34 and 37 after the time t1 has elapsed from start of execution of the receiving process. One α value is used from when the value of the coefficient α is changed to when execution of the receiving process is terminated. Since each of the multipliers 34 and 37 is of the type of multiplying the signal and the coefficient (1−α) or α, it may be implemented by a bit shift circuit and an adder so as to reduce the circuit scale. The value of the coefficient α determines that an averaging operation of the loop filter 30a is to be executed with following capability of which speed. The larger the value of the coefficient α is, the later the average value catches up with a change of the received signal, and the smaller the value of the coefficient α is, the faster the average value catches up with the change of the received signal. The coefficient α is to be set at the design stage by making experiments and simulations. Incidentally, a rather small value of the coefficient α is set as an initial state coefficient before the time t1 elapses after start of execution of the receiving process and a value which is larger than the value of the initial state coefficient α is set as a steady state coefficient α for a time from when the time t1 has elapsed to when execution of the receiving process is terminated. When the initial state coefficient of a rather small value is used as the coefficient α, the value of the coefficient (1−α) is increased in arithmetically operating a formula (the input signal)×(1−α)+(a stored phase rotation amount vector value)×α and hence the influence of the value of the input signal on a result of the above arithmetic operation executed may be increased and the output from the loop filter 30a may sooner follow the value of the input signal. On the other hand, the influence of the stored phase rotation amount vector value on the result of the above arithmetic operation executed may be increased by using the steady state coefficient of a rather large value as the coefficient α. That is, the result of a previously executed arithmetic operation is reflected on the result of the above arithmetic operation more greatly than a new input signal and hence following to the input signal is delayed. However, in the steady state, it is not preferable to sensitively follow fluctuations of the input signal induced by noise because the output from the loop filter 30a may be greatly influenced by the noise. Therefore, in the steady state, the steady state coefficient of a rather large value is used as the coefficient α.

As described above, it may become possible to control flapping of an output from the arg ( ) unit which would occur when the amplitude of the phase rotation amount vector approaches zero (0) by adjusting the amplitude of the phase rotation amount vector that the phase rotation amount vector storage unit 36 outputs to a value within a predetermined range.

Figure 4:
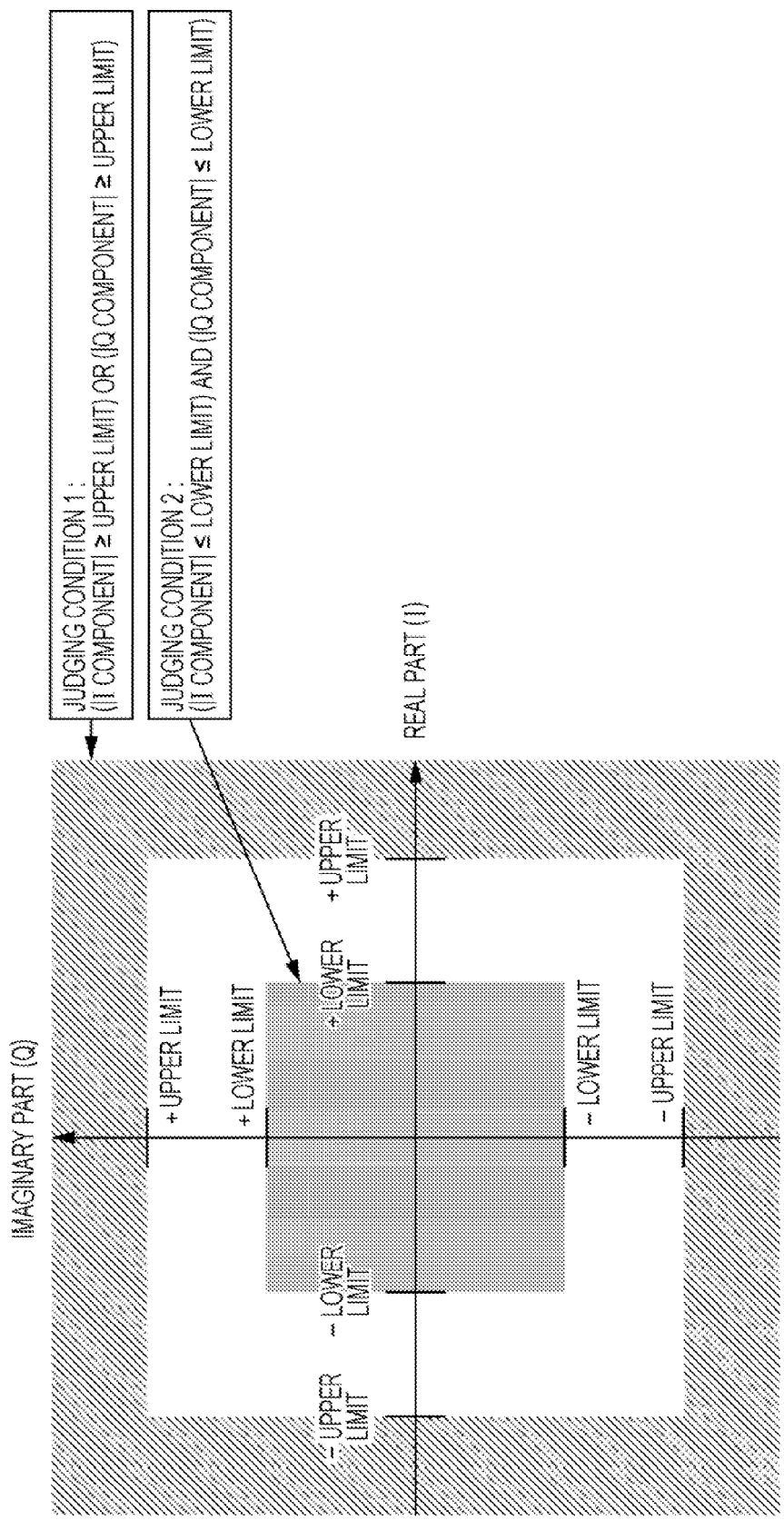
FIG. 4 is a diagram illustrating an example of a range within which the amplitude of a phase rotation amount vector is controlled in the configuration illustrated in FIG. 3.

FIG. 4 is a diagram illustrating an example of a range within which the amplitude of the phase rotation amount vector is controlled in the configuration illustrated in FIG. 3.

The judging condition 1 is (the absolute value of the I component≥an upper limit value) or (the absolute value of the Q component≥the upper limit value) which is set to judge whether the amplitude of the phase rotation amount vector is increased too much on the I-Q plane. In the example illustrated in FIG. 4, when the phase rotation amount vector is set within a shaded area (increased too much), the multiplier coefficient a1 is output from the (I, Q) value judging unit. The judging condition 2 is (the absolute value of the I component≤a lower limit value) and (the absolute value of the Q component≤the lower limit value) which is set to judge whether the amplitude of the phase rotation amount vector is decreased too much on the I-Q plane. In the example illustrated in FIG. 4, when the phase rotation amount vector is set within a gray area (decreased too much), the multiplier coefficient a2 is output from the (I, Q) value judging unit. That is, a desirable multiplier coefficient is input into the multiplier 42 such that the real number component and the imaginary number component of the phase rotation amount vector be held within a predetermined range which is defined by respective plus and minus upper and lower limit values.

When the amplitude of the phase rotation amount vector is decreased too much under the influence of noise, the amplitude is increased to control flapping of the arithmetic operation executed using the arg ( ) unit. On the other hand, when the amplitude of the phase rotation amount is increased too much under the influence of noise, the amplitude is decreased because the number of bits used to express the amplitude is limited and it may become difficult to express the amplitude with sufficient accuracy when the amplitude is increased too much. The above mentioned measure is taken in order to adjust the amplitude of the phase rotation amount vector to a value obtained in its original noiseless state when the phase rotation amount vector which is expected to have a constant amplitude in its original noiseless state is increased too much or decreased too much under the influence of noise. That is, there exists an optimum amplitude that the phase rotation amount vector is to have from the viewpoint of accuracy and hence the arg ( ) unit operates to limit the amplitude within the optimum range.

FIG. 5 to FIG. 8 are diagrams illustrating examples of results of simulations made on related art and the embodiment, illustrating effects of the embodiment.

Figure 5:
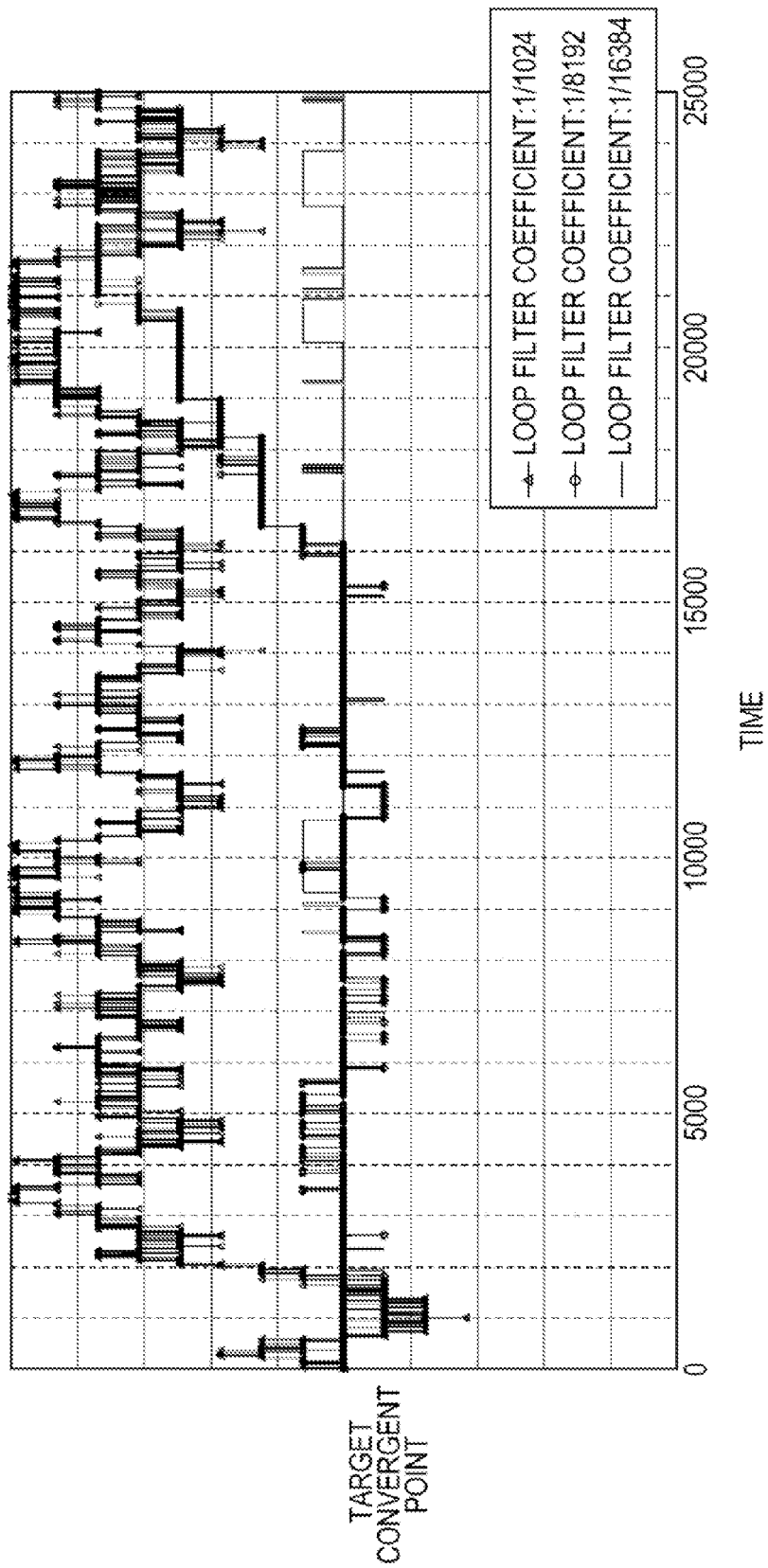
FIG. 5 is a diagram illustrating an example of a result of simulation made on related art.
Figure 6:
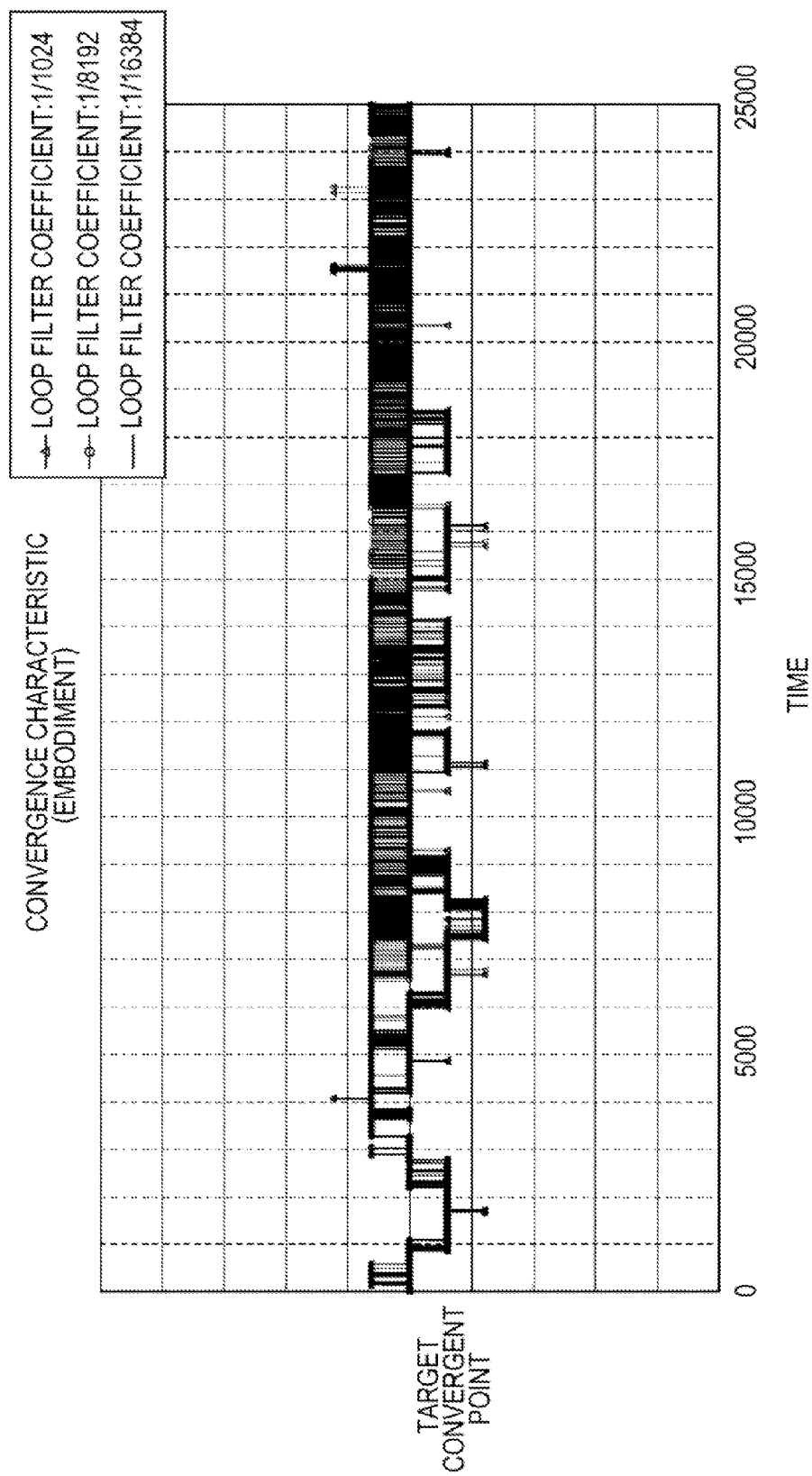
FIG. 6 is a diagram illustrating an example of a result of simulation made on an embodiment.

FIG. 5 and FIG. 6 are diagrams illustrating examples of convergence characteristics. The simulation time is plotted on the lateral axis, the phase value that the phase rotation amount vector has is plotted on the longitudinal axis and the central lateral line indicates a target convergent point. FIG. 5 illustrates an example of a result of simulation made on related art and FIG. 6 illustrates an example of a result of simulation made on the embodiment, each indicating results obtained for three values $1/1024$, $1/8192$ and $1/16384$ of the loop filter coefficient α.

The related art example in FIG. 5 indicates a state in which when the coefficient α is large, output phase values of the phase rotation amount vector locally converge on points deviating from the target convergent point and do not return to their original points readily. The above mentioned state means that the phase values of the phase rotation amount vector no longer indicate correct values and indicates that the related art filter does not favorably operate when it operates as the light source frequency offset estimation circuit.

On the other hand, in the example illustrated in FIG. 6, the phase values of the phase rotation amount vector converge on an area almost in the vicinity of the convergent point in a state in which the values do not locally converge on points greatly apart from the target convergent point in all values of the coefficient α. It may be said that the loop filter operates correctly and a favorable operation is obtained also when it operates as the light source frequency offset estimation circuit.

FIG. 7 and FIG. 8 are diagrams illustrating examples of frequency fluctuation following characteristics. In these drawings, the lateral axis indicates the simulation time and the longitudinal axis indicates the amplitude of each frequency fluctuation. FIG. 7 illustrates a result of simulation made on related art and FIG. 8 illustrates a result of simulation made on the embodiment. The results obtained when the frequency of the input signal is fluctuated to have values of 10 Hz, 50 Hz, 100 Hz and 200 Hz are illustrated.

In the example of related art in FIG. 7, although it seems as though detected frequency values almost correctly follow the frequency fluctuations, parts where the detected frequency values suddenly change are observed as indicated by encircled parts. When such a phenomenon (flapping) as mentioned above is observed, an error occurs in a decoded received signal.

On the other hand, in the example of the embodiment illustrated in FIG. 8, it is seen that flapping as observed in related art does not occur and the detected frequency values smoothly follow the frequency fluctuations. It may become possible to suppress occurrence of errors in the decoded received signal by avoiding occurrence of flapping as illustrated in FIG. 8.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a depicting of the superiority and inferiority of the invention. Although the embodiments of the present invention have been described in detail, it should be understood that the various changes, substitutions, and alterations could be made hereto without departing from the spirit and scope of the invention.

What is claimed is:

1. A loop filter comprising:
    a register configured to store a result of arithmetic operation performed on a complex signal and outputs the stored complex signal;
    a first multiplier configured to multiply the complex signal output from the register and a predetermined coefficient;
    an absolute value judging unit configured to output a multiplier coefficient used to control such that the amplitude of the complex signal output from the register is held in a predetermined range;
    a multiplier configured to multiply an output from the first multiplier and the multiplier coefficient;
    a second multiplier configured to multiply an input signal and a value equal to 1−the predetermined coefficient; and
    an adder configured to add an output from the multiplier to an output from the second multiplier and input a result of addition into the register.

2. The loop filter according to claim 1, wherein
    when an absolute value of a real number component of the complex signal output from the register is at least an upper limit value or an absolute value of an imaginary number component is at least an upper limit value, the absolute value judging unit outputs a first multiplier coefficient as the multiplier coefficient, when the absolute value of the real number component is not more than a lower limit value and the absolute value of the imaginary number component is not more than the lower limit value, it outputs a second multiplier coefficient as the multiplier coefficient, and in other cases, it outputs 1.0 as a third multiplier coefficient, and the multiplier multiplies the output from the first multiplier and any one of the first multiplier coefficient, the second multiplier coefficient and the third multiplier coefficient.

3. The loop filter according to claim 2, wherein the magnitude of the multiplier coefficient that the absolute value judging unit outputs satisfies a relation the first multiplier coefficient<the third multiplier coefficient<the second multiplier coefficient.

4. The loop filter according to claim 2, wherein a judgment logic of the absolute value judging unit is implemented by a logical circuit.

5. The loop filter according to claim 1, wherein the first multiplier, the second multiplier and the third multiplier are implemented by bit shift circuits and adders.

6. The loop filter according to claim 1, wherein the predetermined coefficient is of a value which is larger than 0 (zero) and smaller than 1 (one).

7. The loop filter according to claim 1, wherein the complex signal is an intersymbol phase difference detection signal in a received signal that includes an I signal and a Q signal in optical communications.

8. The loop filter according to claim 7, wherein the first coefficient is used as the predetermined coefficient for a predetermined time after execution of a receiving process has been started, and the second coefficient is used as the predetermined coefficient after the predetermined time has elapsed.

9. A light source frequency offset estimation circuit comprising:
    the loop filter including;
        a register configured to store a result of arithmetic operation performed on a complex signal and outputs the stored complex signal;
        a first multiplier configured to multiply the complex signal output from the register and a predetermined coefficient;
        an absolute value judging unit configured to output a multiplier coefficient used to control such that the amplitude of the complex signal output from the register is held in a predetermined range;
        a multiplier configured to multiply an output from the first multiplier and the multiplier coefficient;
        a second multiplier configured to multiply an input signal and a value equal to 1−the predetermined coefficient; and
        an adder configured to add an output from the multiplier to an output from the second multiplier and inputs a result of addition into the register;
    an intersymbol phase difference detection unit configured to detect a phase difference between two symbols of a received signal that includes an I signal and a Q signal and outputs a difference between a result of detection and an output from the loop filter as a complex signal;
    a feedback path through which the output from the loop filter is input into the intersymbol phase difference detection unit; and
    an arithmetic unit configured to arithmetically operates an argument component of the complex signal output from the loop filter.

10. An optical digital coherent receiver comprising:
    the light source frequency offset estimation circuit according to claim 9.

* * * * *